United States Patent
Henderson et al.

(10) Patent No.: US 7,226,266 B2
(45) Date of Patent: Jun. 5, 2007

(54) REAR LOADING ROOF TOP TRANSPORTER

(75) Inventors: Jack V. Henderson, West Bloomfield, MI (US); Charles Turney, Toledo, OH (US)

(73) Assignee: Magna International Inc., Aurora, Ontario (CA)

( * ) Notice: Subject to any disclaimer, the term of this patent is extended or adjusted under 35 U.S.C. 154(b) by 414 days.

(21) Appl. No.: 10/702,178

(22) Filed: Nov. 5, 2003

(65) Prior Publication Data
US 2004/0131456 A1 Jul. 8, 2004

(51) Int. Cl.
*B60P 9/00* (2006.01)
(52) U.S. Cl. ..................... 414/462; 414/466
(58) Field of Classification Search ............... 414/462, 414/529, 465, 466; 474/146; 74/424.71; 224/310; 464/162
See application file for complete search history.

(56) References Cited

U.S. PATENT DOCUMENTS

| | | | | |
|---|---|---|---|---|
| 2,247,128 A * | 6/1941 | Levey | .......... | 414/532 |
| 2,746,627 A * | 5/1956 | White | .......... | 414/462 |
| 2,859,887 A * | 11/1958 | Haight | .......... | 414/462 |
| 2,931,528 A * | 4/1960 | Mabry | .......... | 414/462 |
| 3,058,636 A * | 10/1962 | Bilbeisi | .......... | 224/492 |
| 3,103,289 A * | 9/1963 | Clary | .......... | 414/462 |
| 3,393,576 A * | 7/1968 | Carlson | .......... | 74/89.42 |
| 3,531,006 A * | 9/1970 | Farchmin | .......... | 414/462 |
| 3,642,154 A * | 2/1972 | Duszka | .......... | 414/522 |
| 3,885,471 A * | 5/1975 | Morine et al. | .......... | 474/144 |
| 4,240,571 A * | 12/1980 | Ernst | .......... | 224/310 |
| 4,260,314 A * | 4/1981 | Golze | .......... | 414/462 |
| 4,291,823 A | 9/1981 | Freeman et al. | | |
| 4,295,588 A * | 10/1981 | Kowalski et al. | .......... | 224/321 |
| 4,826,387 A | 5/1989 | Audet | | |
| 4,948,024 A | 8/1990 | Warner et al. | | |
| 5,423,650 A * | 6/1995 | Zerbst et al. | .......... | 414/462 |
| 5,505,579 A | 4/1996 | Ray et al. | | |
| 5,649,655 A | 7/1997 | Kerner | | |
| 5,690,259 A * | 11/1997 | Montani | .......... | 224/310 |
| 5,782,391 A | 7/1998 | Cretcher | | |
| 5,850,891 A * | 12/1998 | Olms et al. | .......... | 182/127 |
| 5,910,192 A * | 6/1999 | Pulford et al. | .......... | 74/479.01 |
| 6,015,074 A | 1/2000 | Snavely et al. | | |
| 6,084,326 A * | 7/2000 | Nagai et al. | .......... | 310/80 |

(Continued)

*Primary Examiner*—Eileen D. Lillis
*Assistant Examiner*—Evan English
(74) *Attorney, Agent, or Firm*—Clark Hill PLC

(57) ABSTRACT

A roof rack assembly is provided for storing items above a roof of a motor vehicle. The roof rack assembly includes a pair of rails fixedly secured to the roof, parallel to each other. Each of the rails has a channel therealong. A tray includes a first end slidingly engaging the channel and a second end. The tray is movable between a storage position above the roof and a loading position along the side of the motor vehicle. A pair of pivot arms extends between a receiving end and a pivot end. The receiving end is pivotally coupled to the second end of the tray. A pair of mounting brackets are fixedly secured to the side of the motor vehicle and pivotally coupled to the pivot arms at the pivot end thereof. Each of the mounting brackets includes a stop for limiting pivotal movement of the pivot arms as the tray moves from the storage position to the loading position in order to maintain the tray in the loading position.

14 Claims, 11 Drawing Sheets

U.S. PATENT DOCUMENTS

| | | |
|---|---|---|
| 6,105,840 A | 8/2000 | Trevino et al. |
| 6,158,638 A * | 12/2000 | Szigeti ........................ 224/310 |
| 6,308,874 B1 | 10/2001 | Kim et al. |
| 6,338,427 B1 | 1/2002 | Aftanas et al. |
| 6,427,888 B1 | 8/2002 | Condon et al. |
| 6,428,263 B1 * | 8/2002 | Schellens .................... 414/462 |
| 6,679,407 B2 * | 1/2004 | Weeks ........................ 224/310 |
| 6,715,652 B2 * | 4/2004 | Kmita et al. ................. 224/314 |
| 6,772,928 B2 * | 8/2004 | Ford et al. ................... 224/497 |
| 2002/0014504 A1 | 2/2002 | Hetu |
| 2004/0118884 A1 * | 6/2004 | Ford et al. ................... 224/310 |
| 2004/0131455 A1 * | 7/2004 | Henderson ................... 414/462 |
| 2005/0095102 A1 * | 5/2005 | Watson ........................ 414/462 |

* cited by examiner

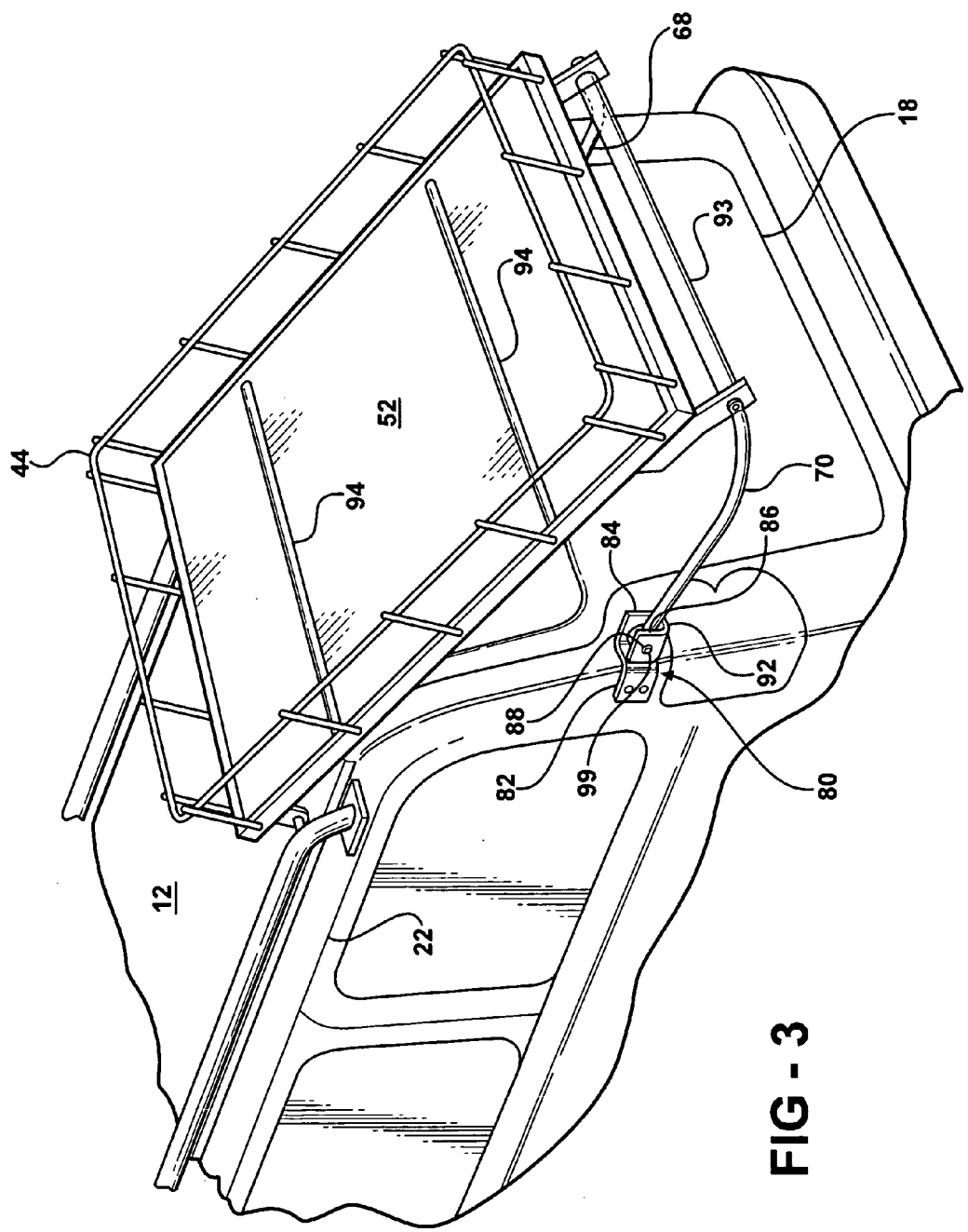

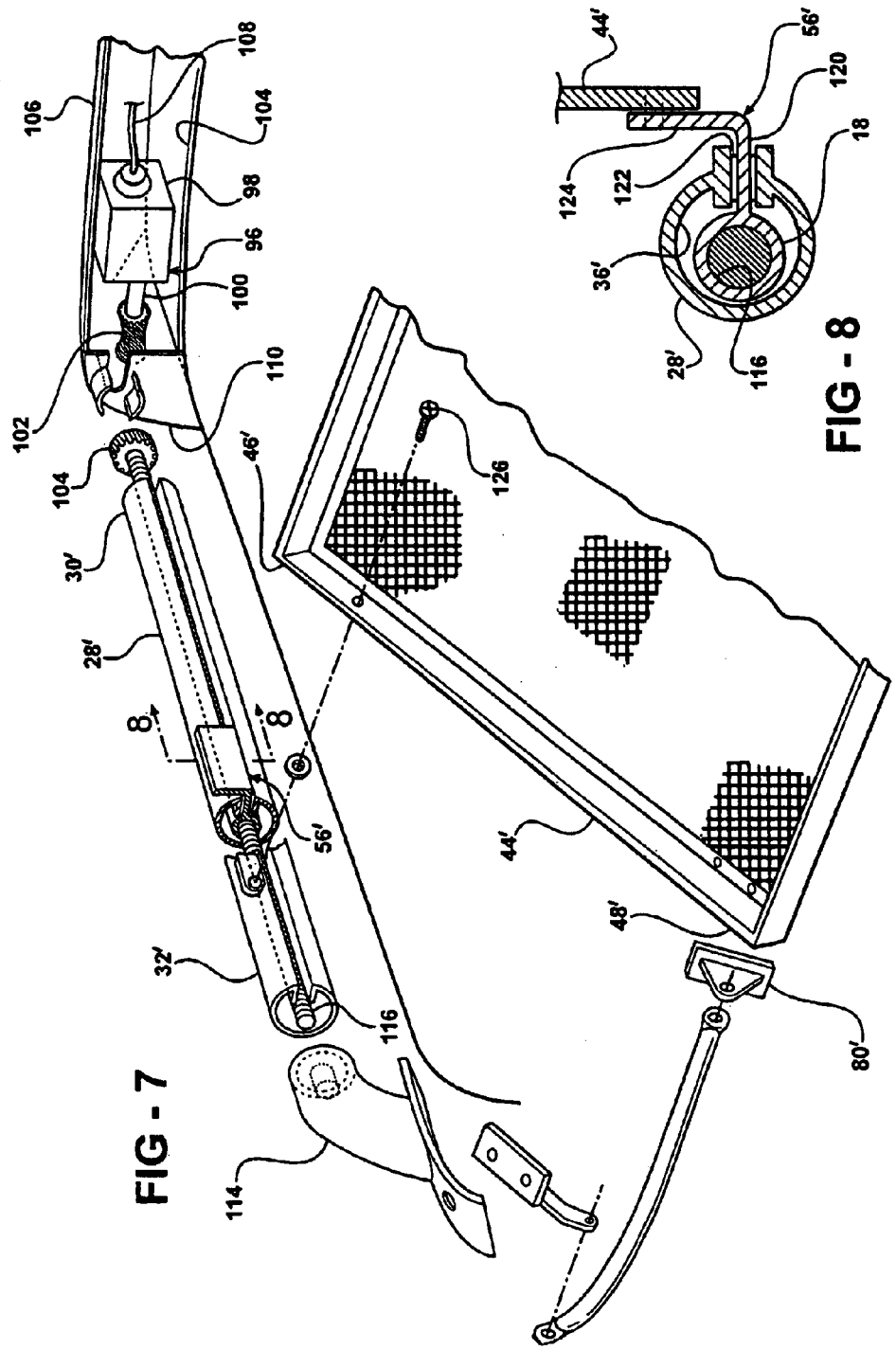

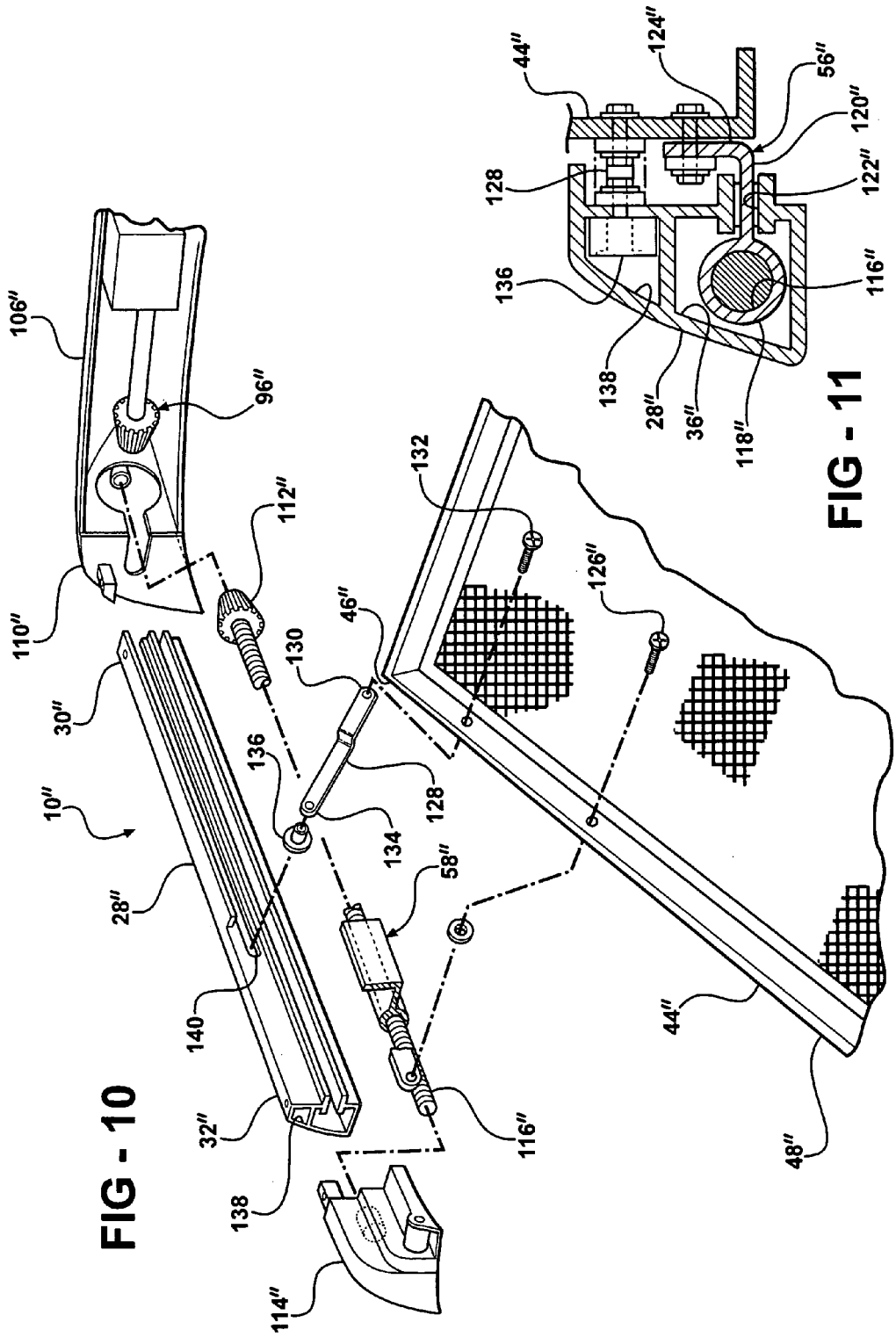

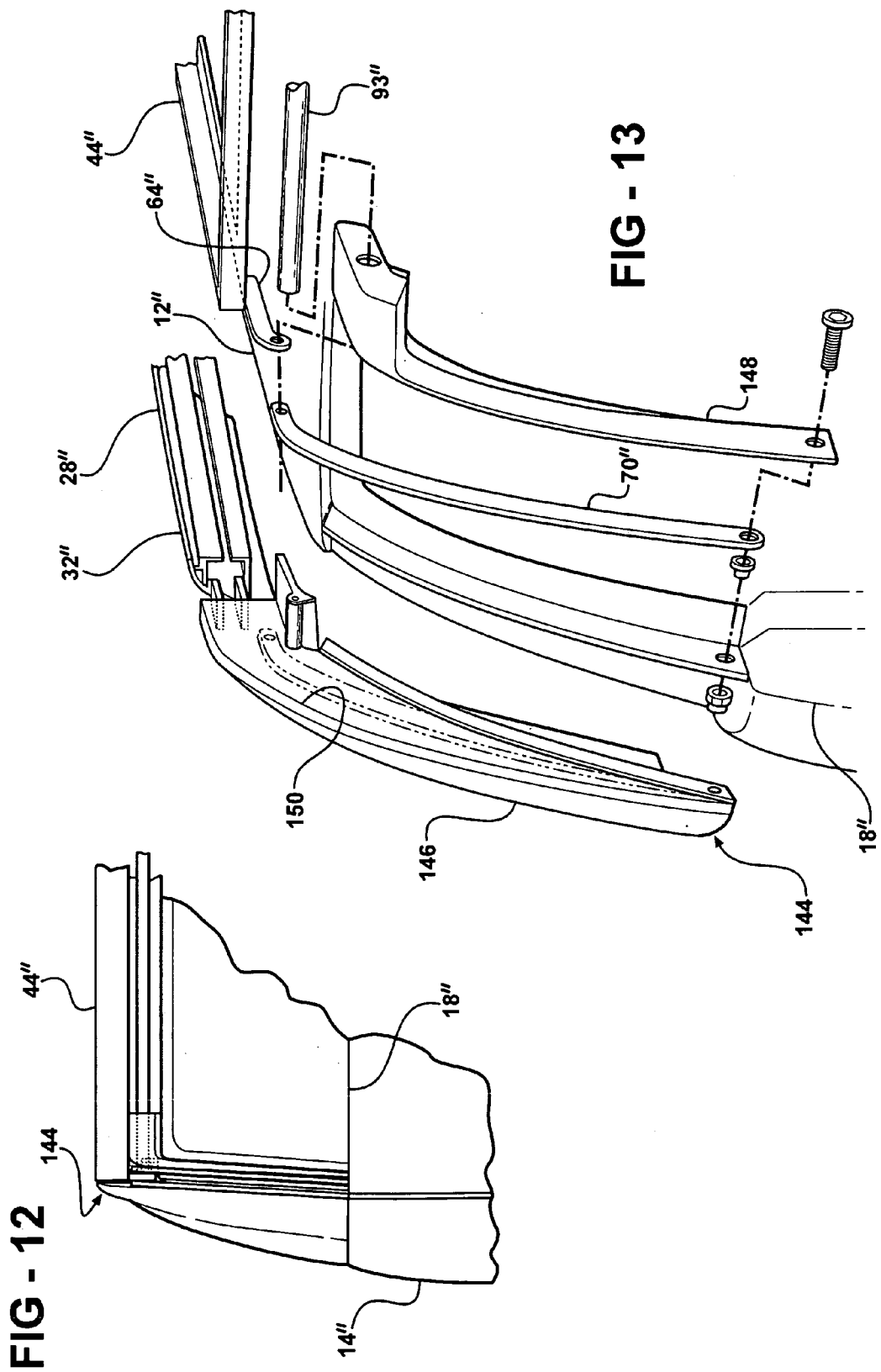

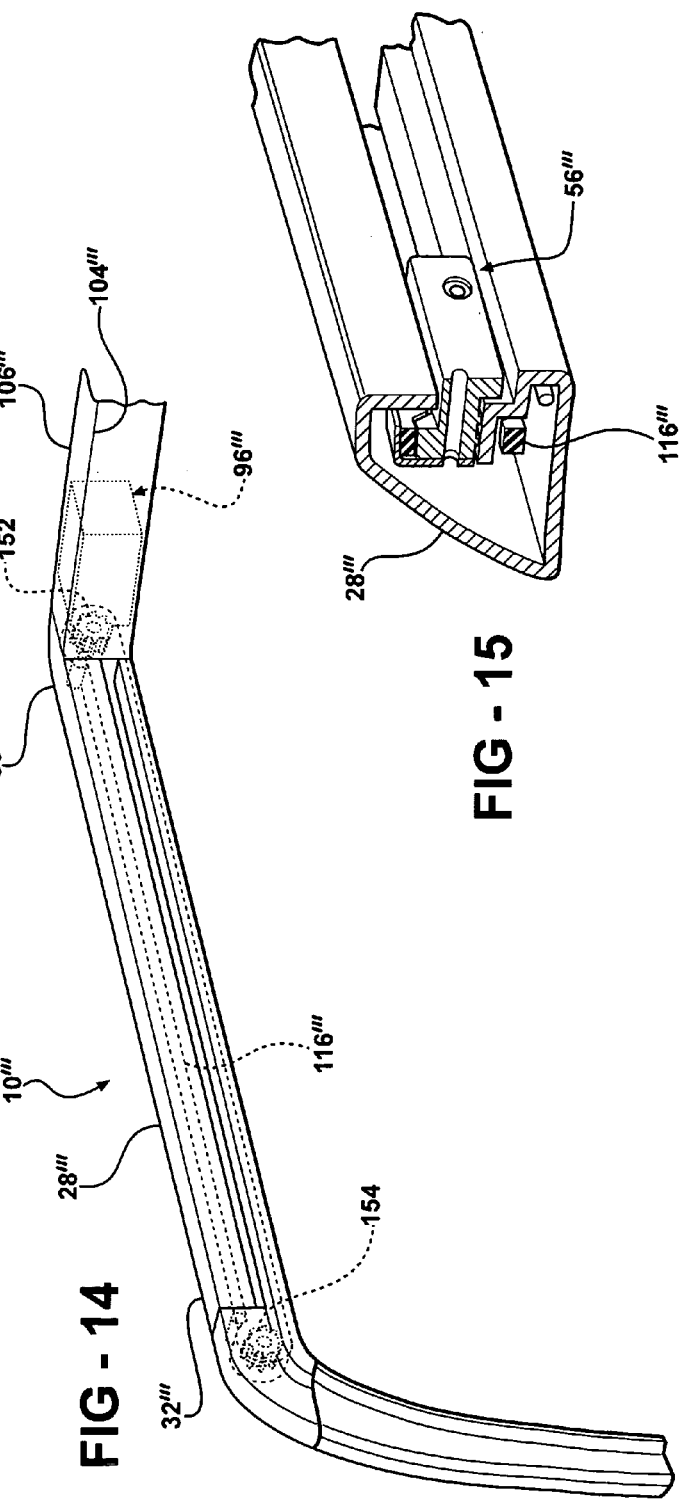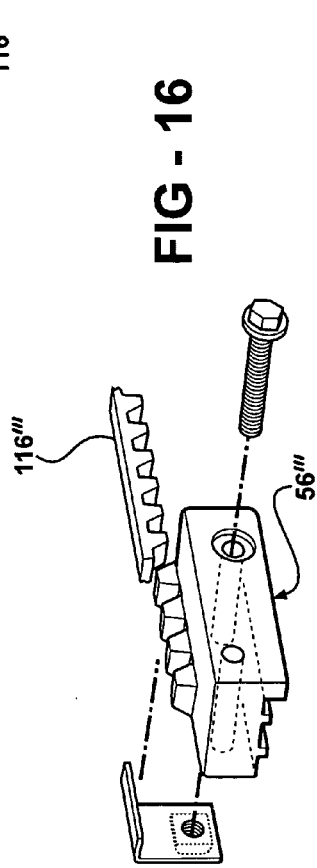

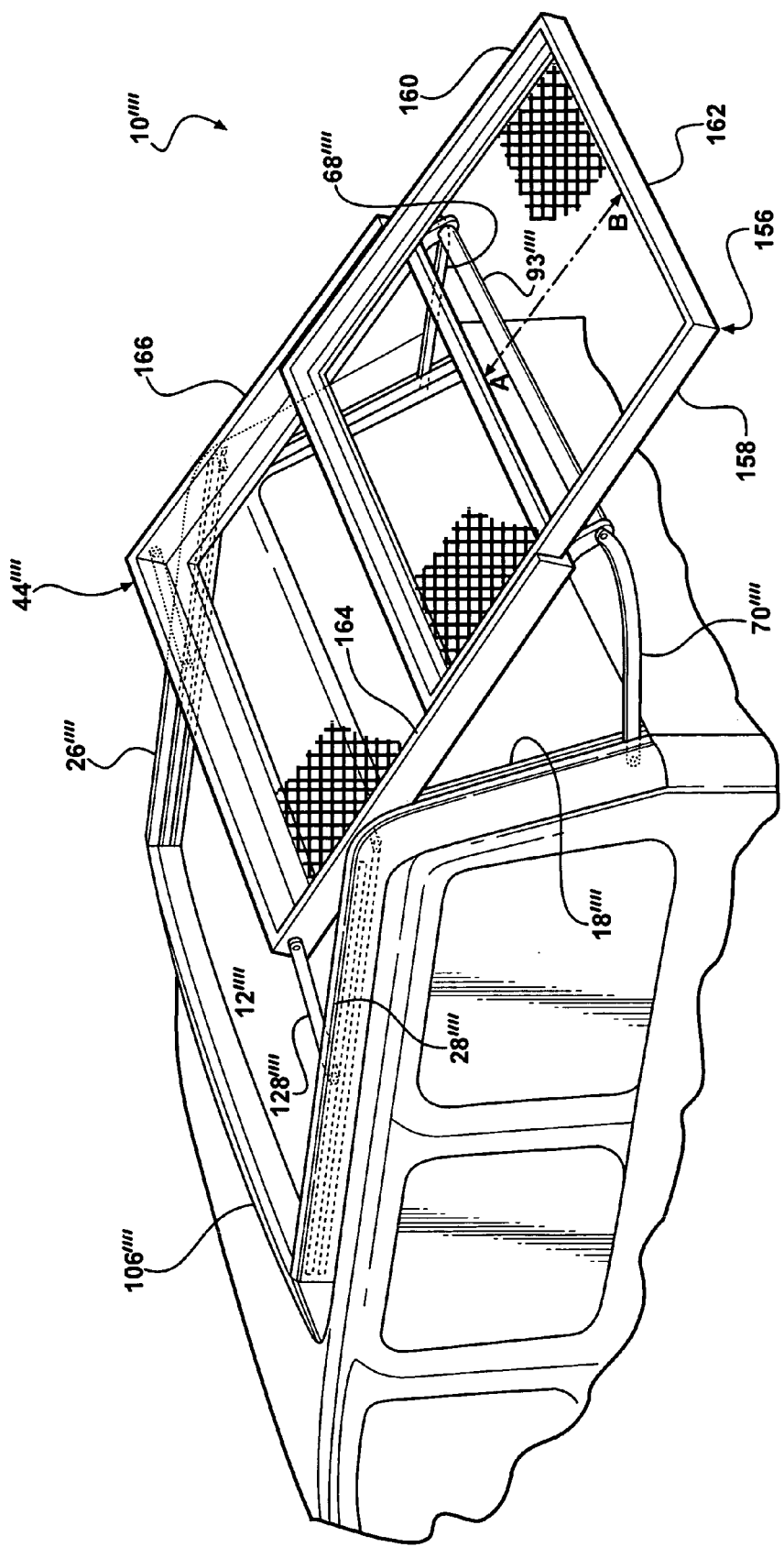

REAR LOADING ROOF TOP TRANSPORTER

FIELD OF THE INVENTION

This invention relates to a roof rack assembly for a motor vehicle. More particularly, the invention relates to a roof rack assembly that is movable between storage and loading positions.

DESCRIPTION OF THE RELATED ART

Roof racks allow for the storage of various items, including luggage, trunks, bicycles, canoes, and skis, above a roof of a motor vehicle. The storage of such items above the roof increases storage capacity of the motor vehicle.

Accessing the roof rack can, however, be a problem for many users. For example, sport utility vehicles and minivans typically have a roof height above the shoulder level of most individuals. As a result, any item that is to be stored on the roof rack must first be raised above the roof height before loading onto the roof rack. In addition, once the item is raised to the roof, it may need to be tied to the roof rack in order to remain thereon during motor vehicle operation. Thus, an individual attempting to load a large or heavy item on the roof rack must exert a great deal of effort to utilize the roof rack.

To reduce the amount of effort required to raise certain items to the roof height of the motor-vehicle, various systems and devices have been developed that move the roof rack off of the roof to a position closer to the ground. As a result, items that are to be stored on the roof rack need not be raised to a height above the roof for loading the item onto the roof rack.

U.S. Pat. No. 6,427,888 to Condon et al. discloses a roof rack that moves between a storage position and a loading/unloading position. The roof rack is one component of a roof top luggage holder, which also includes a roof track and a rear frame having a hinge arm. The roof track extends fore and aft along a roof of a motor vehicle. The roof rack slidably engages the roof track at the fore of the motor vehicle. The roof rack is also pivotally attached to a first end of the hinge arm at the aft of the motor vehicle. A second end of the hinge arm is pivotally secured to a tailgate at the rear of the motor vehicle. The second end of the hinge arm pivots relative to the tailgate to swing the roof rack from a storage position on top of the roof down to a loading/unloading position at the rear of the motor vehicle. The hinge arm pivots approximately 180 degrees as the roof rack moves between its storage and loading/unloading positions. When the roof rack is in its loading/unloading position, it is essentially parallel to the tailgate of the motor vehicle.

SUMMARY OF THE INVENTION

According to one aspect of the invention, a roof rack assembly is provided for storing items above a roof of a motor vehicle. The roof rack assembly includes a pair of rails fixedly secured to the roof parallel to each other. Each of the pair of rails defines a channel therealong. A tray includes a first end slidingly engaging the channel and a second end. The tray is movable between a storage position above the roof and a loading position along the side of the motor vehicle. A pair of pivot arms extends between a receiving end and a pivot end. The receiving end is pivotally coupled to the second end of the tray. A pair of mounting brackets are fixedly secured to the side of the motor vehicle and pivotally coupled to the pair of pivot arms at the pivot end thereof. Each of the pair of mounting brackets includes a stop for limiting pivotal movement of the pair of pivot arms as the tray moves from the storage position to the loading position to prevent the tray from moving past the loading position. The pivot arms continuously support the tray, especially when the tray is in the loading position.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a fragmentary, rear perspective view of the motor vehicle including a pair of mounting brackets fixedly secured thereto and pivotally coupled to a pair of pivot arms;

FIG. 7 is an exploded, fragmentary, perspective view of the roof rack assembly according to the second embodiment;

FIG. 8 is an enlarged, cross-sectional, side view taken along lines 8—8 in FIG. 7;

FIG. 10 is an exploded, perspective view of the roof rack assembly according to the third embodiment including an upper housing;

FIG. 11 is an enlarged, cross-sectional, side view taken along lines 11—11 in FIG. 10;

FIG. 12 is a fragmentary, rear view of the motor vehicle including a cover assembly for one of a pair of pivot arms;

FIG. 13 is an exploded, fragmentary, rear perspective view of the third embodiment including the cover assembly;

FIG. 14 is a fragmentary, rear perspective view of a fourth embodiment of the invention;

FIG. 15 is a fragmentary, rear perspective view of one of a pair of rails;

FIG. 16 is an isolated, perspective view of a sliding bracket for slidingly engaging the one of a pair of rails; and FIG. 17 is a fragmentary, rear perspective view of a roof rack assembly according to a fifth embodiment of the invention mounted to a motor vehicle.

DETAILED DESCRIPTION OF THE PREFERRED EMBODIMENTS

Figure 1:
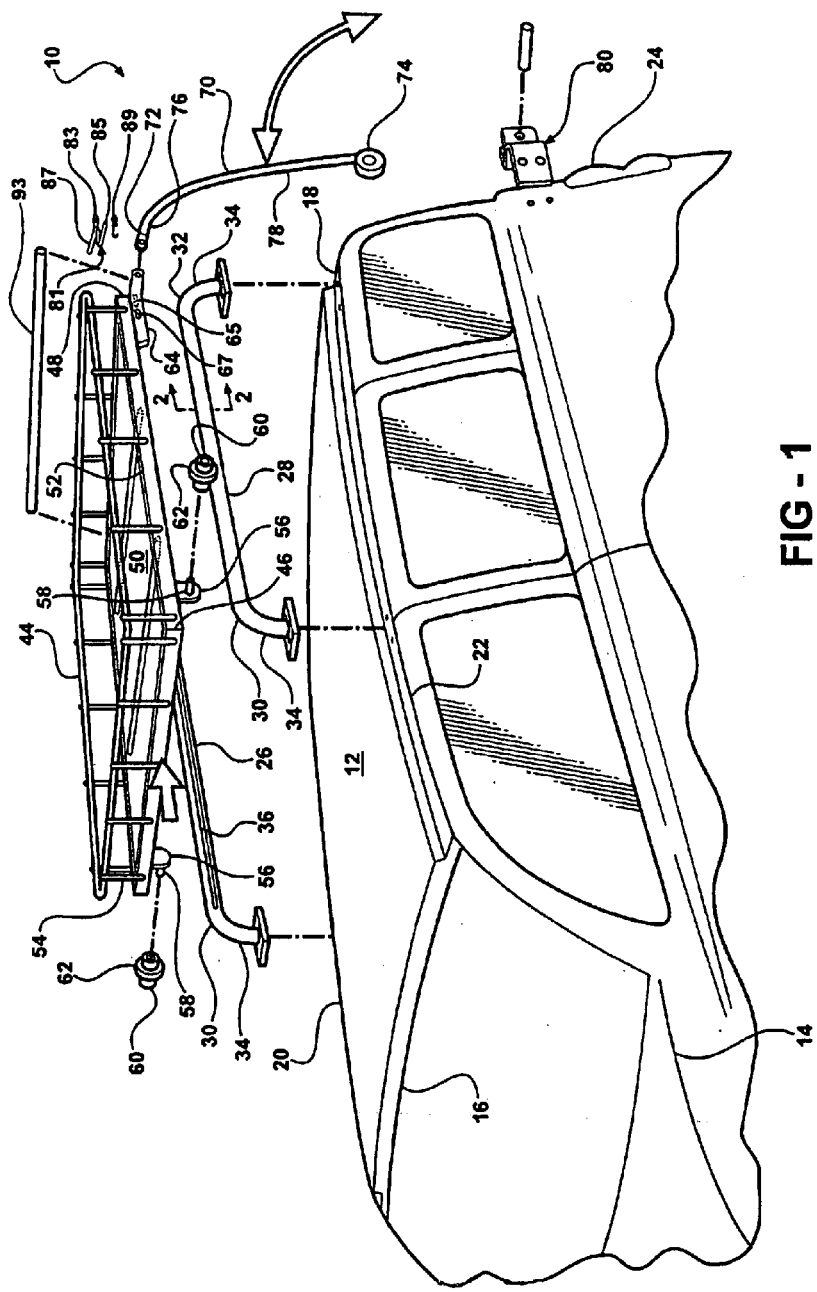
FIG. 1 is an exploded, front perspective view of a roof rack assembly according to a first embodiment of the invention mounted to a motor vehicle, partially cut away.

Referring to FIG. 1, a roof rack assembly, generally shown at 10, is adapted to be mounted along a roof 12 of a motor vehicle 14. The roof 12 extends longitudinally between a front windshield 16 and a back or aft end 18 of the motor vehicle 14. The roof 12 also extends laterally between a pair of opposing sides 20, 22 of the motor vehicle 14. A tail light 24 is disposed along the aft end 18 of the motor vehicle 14 adjacent each of the sides 20, 22.

The roof rack assembly 10 includes a pair of rails 26, 28 fixedly secured to the roof 12. The pair of rails 26, 28 are spaced apart and parallel to each other. Each of the pair of rails 26, 28 extends between a fore end 30 and an aft end 32. A mounting leg 34 is provided at the fore 30 and aft 32 ends of each of the pair of rails 26, 28. The mounting legs 34 attach the pair of rails 26, 28 to the roof 12.

Figure 2:
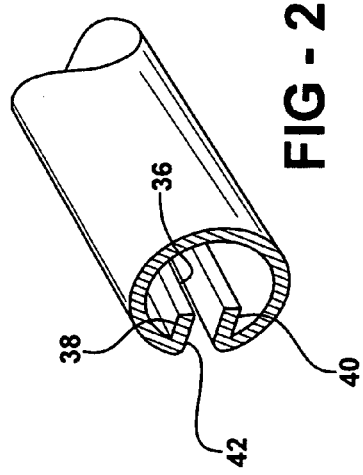
FIG. 2 is a cross-sectional, perspective view taken along lines 2—2 of FIG. 1.

Each of the pair of rails 26, 28 includes a channel 36. The channel 36 is generally C-shaped and includes a channel length extending between the fore 30 and aft 32 ends. Referring to FIG. 2, the channel 36 includes a pair of opposing folded segments 38, 40 defining an opening 42 therebetween. It is appreciated that although the channel 36 is shown as being generally C-shaped and as having folded segments 38, 40, the channel 36 may be formed in any of a variety of different configurations.

Referring back to FIG. 1, a basket or tray, generally indicated at 44, extends between a first end 46 and a second end 48. The tray 44 includes a platform 50 and a generally rectangular platform frame 52 extending around the platform 50. A railing 54 extends upwards from the platform frame 52 and defines a storage space. It is recognized that the exact shape of the tray 44 may vary depending upon the items to be stored thereon or therein.

The tray 44 includes spaced apart sliding brackets 56 fixedly secured thereto. More specifically, each sliding bracket 56 extends downwardly from the platform frame 52 at the first end 46 of the tray 44. The sliding brackets 56 each include a slide pin 58 extending out therefrom. The slide pin 58 is received within the opening 42 for slidingly engaging the channel 36.

A roller 60 is fixedly secured to the slide pin 58. The roller 60 provides for smooth sliding engagement of the slide pin 58 within the channel 36. A spacer 62 may be secured to the slide pin 58 adjacent the roller 60. The spacer 62 maintains the pair of rails 26, 28 and the tray 44 in a spaced apart relationship so as not to interfere with the sliding engagement of the slide pin 58 within the channel 36.

The tray 44 also includes spaced apart pivot brackets 64 fixedly secured thereto. More specifically, the pivot brackets 64 depend from the platform frame 52 at the second end 48 of the tray 44. Each pivot bracket 64 includes an inwardly extending receiving surface 65 and a slot 67 adjacent thereto.

The roof rack assembly 10 also includes a pair of pivot arms 68, 70. Each of the pair of pivot arms 68, 70 extends between a receiving end 72 and a pivot end 74. In addition, each of the pair of pivot arms 68, 70 includes a short portion 76 and an elongated portion 78 extending away therefrom. The receiving end 72 is located at one end of the short portion 76. The pivot end 74 is located at one end of the elongated portion 78. In a preferred embodiment, the elongated portion 78 is generally perpendicular to the short portion 76.

The receiving end 72 of each of the pair of pivot arms 68, 70 is pivotally coupled to the tray 44 about the pivot pin 66 thereof. The pivot end 74 of each of the pair of pivot arms 68, 70 is pivotally coupled to one of a pair of mounting brackets, generally indicated at 80. The pair of pivot arms 68, 70 bears the load of the tray 44 as the tray 44 moves between its storage and loading positions.

Referring to FIG. 3, each of the pair of mounting brackets 80 is disposed along the aft end 18 of the motor vehicle 14 and along one of the pair of sides 20, 22. Each of the pair of mounting brackets 80 includes an L-shaped base portion 82 fixedly secured to the motor vehicle 14. More specifically, the base portion 82 is mounted to the back end 18 and to one of the sides 20, 22.

Each of the pair of mounting brackets 80 also includes a pair of parallel and spaced apart side walls 84, 86 extending out from the base portion 82. The side walls 84, 86 extend rearward of the motor vehicle 14. Each of the pair of side walls 84, 86 includes apertures 88. A fastener 90 extends through each of the apertures 88 to interconnect the side walls 84, 86 with the pair of pivot arms 68, 70. The pair of pivot arms 68, 70 pivots about the fastener 90.

A stop or floor portion 92 extends horizontally between the side walls 84, 86. The stop 92 is generally parallel with the roof 12. The stop 92 limits pivoting of the pair of pivot arms 68, 70 about each of the pair of mounting brackets 80.

Figure 4:
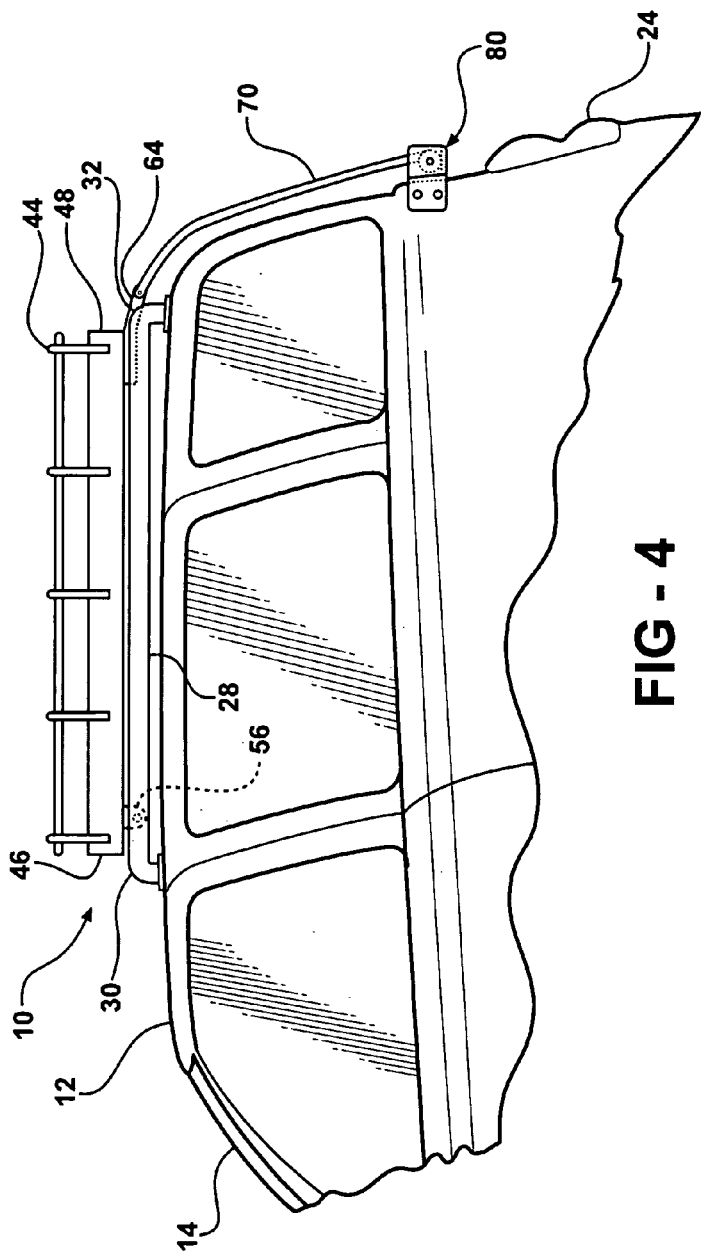
FIG. 4 is a fragmentary, side view of the motor vehicle including the roof rack with a tray in a storage position.
Figure 5:
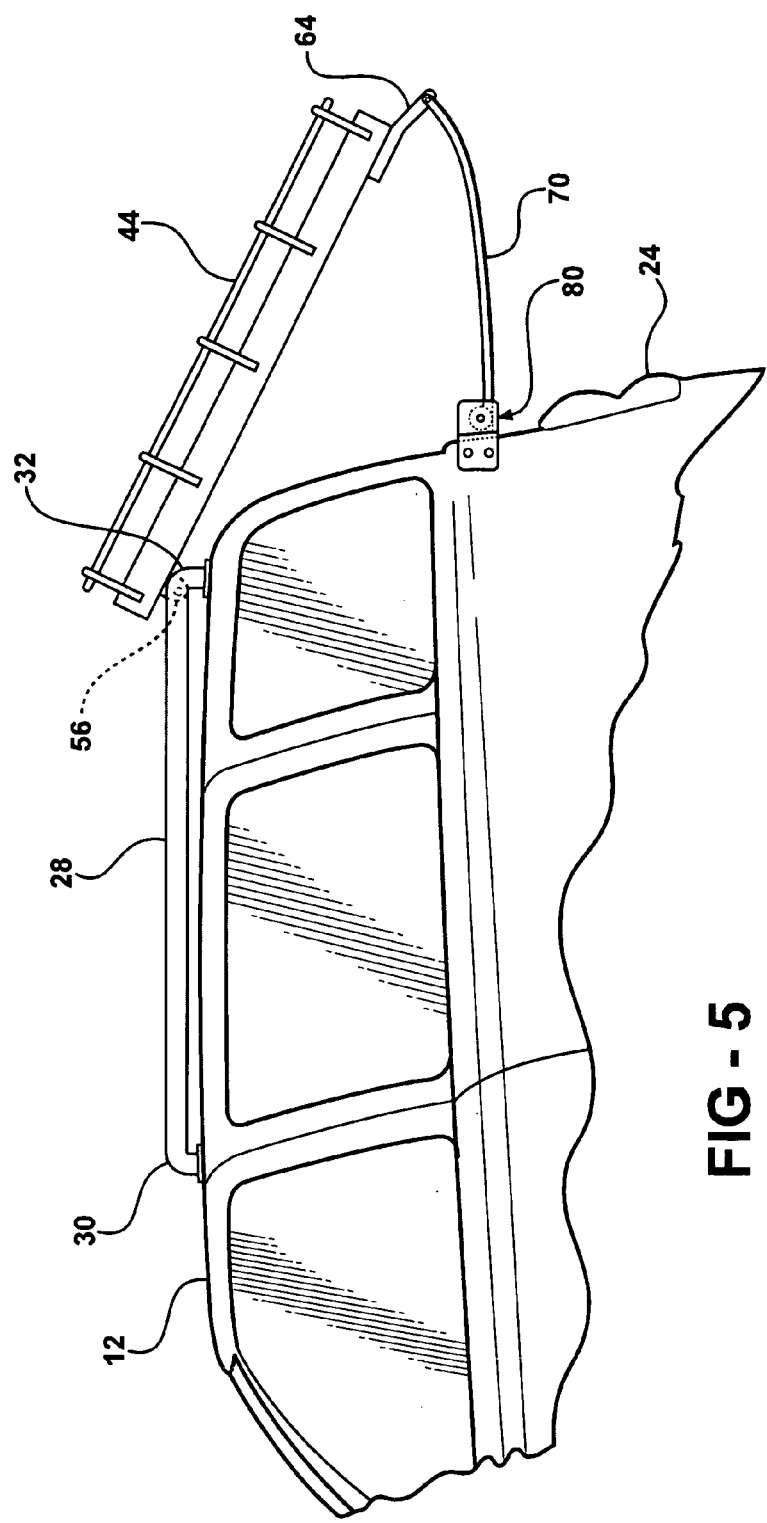
FIG. 5 is a fragmentary, side view of the motor vehicle with the tray in a loading position.

The roof rack assembly 10 is utilized for storage and transport of items above the roof 12 during motor vehicle operation. The tray 44 is movable between a storage position above the roof 12, as shown in FIG. 4, and a loading position alongside the back end 18 of the motor vehicle 14, as shown in FIG. 5. It will, however, be appreciated that the roof rack assembly 10 may be oriented so that the tray 44 extends out over either one of the pair of sides 20, 22 when in its loading position.

A grab bar 93 extends between two of the pivot brackets 64. The grab bar 93 is utilized to manually move the tray 44 between the storage and loading positions.

A locking mechanism, generally indicated at 81, includes a center hub 83. The center hub 83 is pivotally coupled to the receiving surface 65 by a pin (not shown). An engaging arm 85 and a release lever 87 extend out from the center hub 83 in opposing directions. The engaging arm 85 extends through the slot 67 and is received within the channel 36. A tension spring 89 biases the engaging arm 85 into engagement with the channel 36. When the engaging arm 85 extends into the channel 36, the tray 44 is locked in its storage position. Actuation of the release lever 87 in a rearward direction pivots the locking mechanism 81 about the receiving surface 65 to urge the engaging arm 85 out of the channel 36. As a result, the tray 44 may be moved out of the storage position.

Still referring to FIG. 3, the tray 44 includes a pair of storage ramps 94 disposed along the platform 52. Each of the pair of storage ramps 94 has a generally semi-circular cross section. It is, however, appreciated that the cross section of the pair of storage ramps 94 may vary. When an individual places an item in an upper half of the tray 44 while the tray 44 is in the loading position, the pair of storage ramps 94 retains that item in the upper half so that additional items can be placed in a lower half of the tray 44. The individual is, therefore, able to make full use of the storage capacity of the tray 44.

In operation, starting with the tray 44 in the storage position above the roof 12, as shown in FIG. 4, the individual first pulls on the grab bar 93. As a result, the sliding bracket 56 slides along the channel 36 towards the aft end 32 of the rails 26, 28. The movement of the sliding bracket 56 causes the tray 44 to slide rearwardly along the roof 12. At the same time, the pair of pivot arms 68, 70 pivots relative to the pair of mounting brackets 80 and continuously supports the tray 44 during travel. The sliding bracket 56 slides along the length of the channel 36 until it reaches a final position at the aft end 30 of one of the pair of rails 26, 28. When the sliding bracket 56 reaches the end of the channel 36, the pair of pivot arms 68, 70 abuts against the stop 92. As a result, pivotal movement of the pair of pivot arms 68, 70 ends and the tray 44 is presented in its loading position, as shown in FIG. 5, inclined to the horizontal at about 45°.

Figure 6:
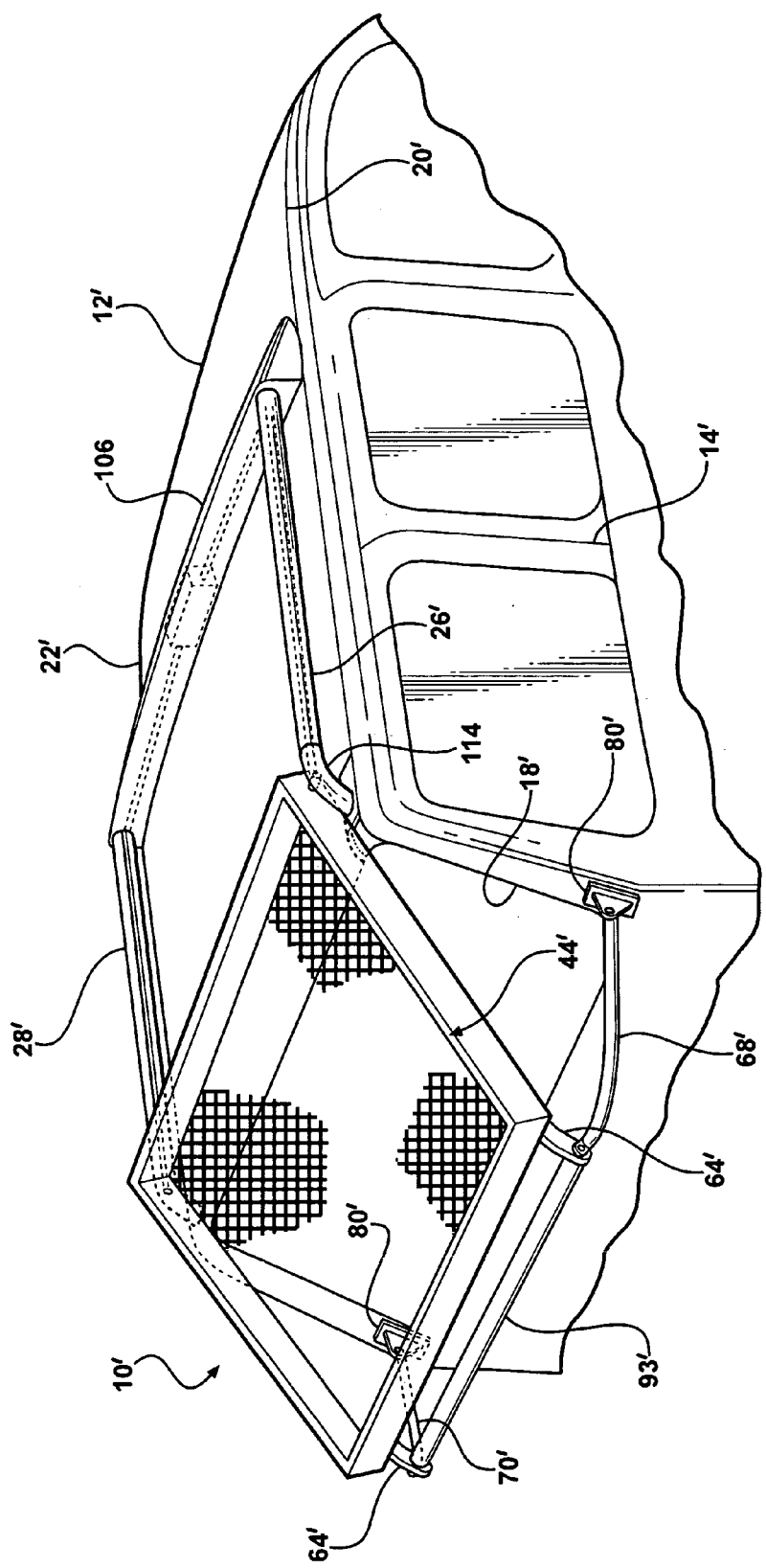
FIG. 6 is a fragmentary, perspective view of the motor vehicle including a roof rack assembly according to a second embodiment of the invention.

Referring to FIGS. 6 through 8, wherein like primed reference numerals represent similar elements as those described above, a second embodiment of the invention includes a drive assembly, generally indicated at 96 in FIG.

7, for moving the tray 44' between the storage and loading positions. The drive assembly 96 includes a motor 98, a clutch 100, and a gear 102.

The drive assembly 96 is housed within an interior portion 104 of a mounting panel 106. The interior portion 104 also houses electrical wiring 108 that extends from inside the motor vehicle 14' to power the drive assembly 96. The mounting panel 106 is fixedly attached to the roof 12' and extends between the pair of rails 26', 28'. Although the drive assembly 96 is shown as being housed within the mounting panel 106, it is contemplated that the drive assembly 96 may be located at various positions outside of the mounting panel 106.

Still referring to FIG. 7, the mounting panel 106 extends between a pair of front stanchions 110 (one shown). One of the front stanchions 110 includes a drive gear 112 that is engaged by the gear 102 of the drive assembly 96. A pair of rear stanchions 114 is fixedly mounted to the roof 12' adjacent to the back end 18' of the motor vehicle 14'. Each of the pair of rear stanchions 114 is aligned longitudinally with one of the pair of front stanchions 110.

Each of the pair of rails 26', 28' extends between the longitudinally aligned front 110 and rear 114 stanchions, as shown in FIG. 6. Referring now to FIGS. 7 and 8, a drive mechanism 116 is disposed adjacent to and extends along one of the pair of rails 26', 28'. The drive mechanism 116 is operably connected to the motor 98. The drive mechanism 116 may be a lead screw, a chain, a cable, a tape, a belt, or a combination thereof.

In the current embodiment, the drive mechanism is a lead screw 116. The lead screw 116 is disposed within the channel 36' of one of the pair of rails 26', 28', and extends between the fore 30' and aft 32' ends thereof. The lead screw 116 is rotatably engaged by the drive gear 112.

Referring specifically to FIG. 8, the sliding bracket 56' includes an internally threaded, circular guide 118 rotatably engaging the lead screw 116. The sliding bracket 56' is driven by the lead screw 116 to move between the fore 30' and aft 32' ends of one of the pair of rails 26', 28'.

The sliding bracket 56' also includes a horizontal segment 120 extending away from the circular guide 118 and disposed within the opening 42'. A roller bearing 122 is secured over the horizontal segment 120. The roller bearing 122 provides for smooth sliding movement of the sliding bracket 56' along one of the pair of rails 26', 28'.

The sliding bracket 56' further includes an upright, mounting flange 124. The mounting flange 124 is pivotally secured to the tray 44' adjacent the first end 46' thereof by a pivot pin 126. As the sliding bracket 56' moves between the fore 30' and aft 32' ends of one of the pair of rails 26', 28', the tray 44' pivots about the pivot pin 126 between the storage and loading positions.

The roof rack assembly 10' may also incorporate an anti-pinch device (not shown), as is well known to those skilled in the art. The anti-pinch device is operatively connected to the motor 98. The anti-pinch device automatically reverses the tray 44' upon sensing or contacting an obstruction in the path of the tray 44" so that the tray 44' does not damage the obstruction.

In operation, the movement of the tray 44' from the storage position to the loading position is initiated by a power switch (not shown) inside the motor vehicle 14' or by a remote control (not shown). The motor 98 is thereby activated, which, in turn, causes the lead screw 116 to rotate. The rotation of the lead screw 116 drives the sliding bracket 56' to move towards the aft end 32' of one of the pair of rails 26', 28'. As the sliding bracket 56' moves towards the aft end 32', the tray 44' pivots about the pivot pin 126. At the same time, the pair of pivot arms 68', 70' pivots about the pair of mounting brackets 80' along the back end 18' of the motor vehicle 14'. The pair of pivot arms 68', 70' bears the load of the pivoting tray 44'. When the sliding bracket 56' reaches the aft end 32' of the one of the pair of rails 26', 28', the tray 44' is in its loading position.

Referring to FIGS. 9 through 13, wherein like double primed numerals represent elements similar to those of the first embodiment, a third embodiment of the invention 10" includes a link arm or counterbalance cable 128 that extends between one of the pair of rails 26", 28" and the tray 44". Referring specifically to FIGS. 10 and 11, the link arm 128 includes an end 130 pivotally secured to the tray 44" by a pin 132, and an opposing rail end 134 pivotally secured to one of the pair of rails 26", 28". The link arm 128 assists in retaining the tray 44" in the loading position.

A slide bushing 136 is fixedly secured to the rail end 134 of the link arm 128. The slide bushing 136 is received within an upper housing 138. The slide bushing 136 facilitates sliding of the link arm 128 along one of the pair of rails 26", 28".

The upper housing 138 is disposed above the channel 36" and extends from the fore end 30" of one of the pair of rails 26", 28" to a housing end 140. Thus, as the sliding bracket 56" slides from the fore end 30" to the aft end 32" of one of the pair of rails 26", 28", the slide bushing 136 will travel between the fore end 30" and the housing end 140. When the slide bushing 136 reaches the housing end 140, the link arm 128 pivots about the pin 132 to retain the tray 44" in the loading position.

Figure 9:
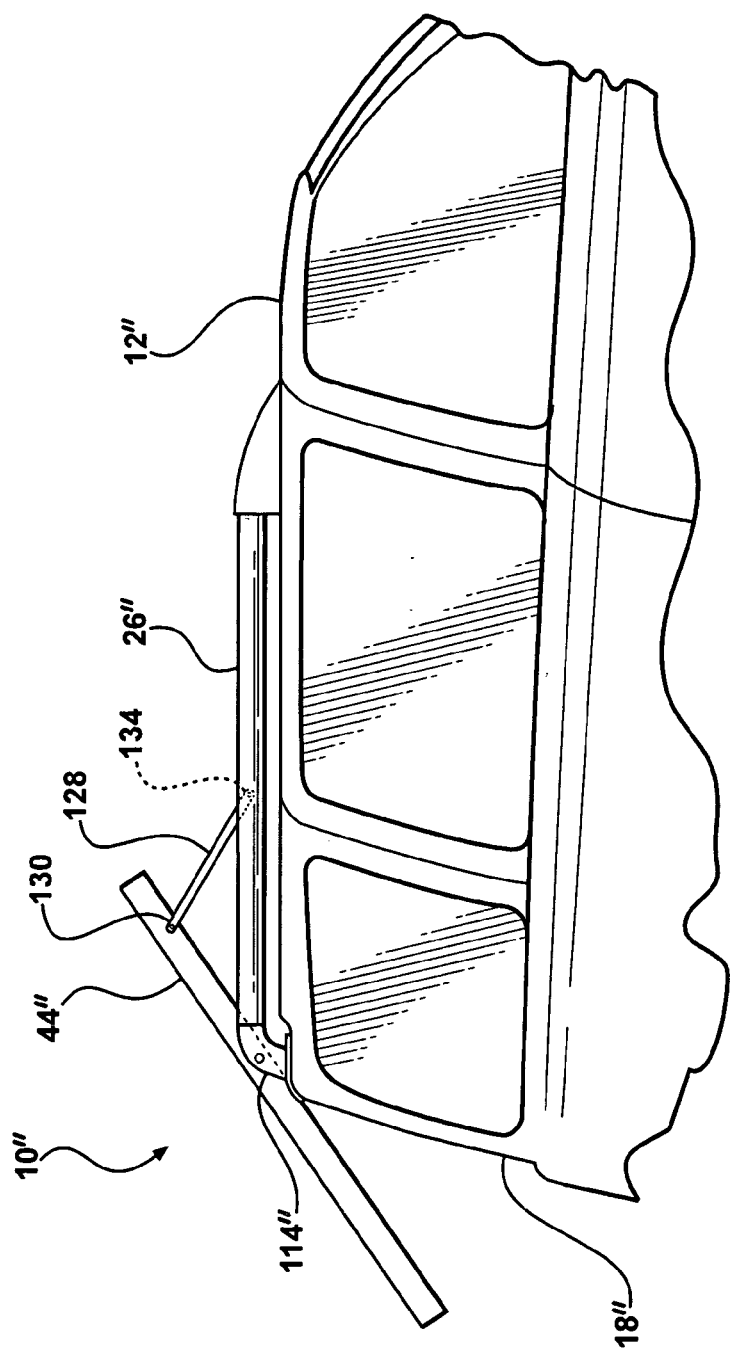
FIG. 9 is a side view of the roof rack assembly according to a third embodiment.

The link arm 128 may be utilized by itself, as is shown in FIGS. 9 through 11, or in combination with the pair of pivot arms 68", 70", as is shown in FIG. 12.

Referring specifically to FIG. 10, each of the rear stanchions 114" includes a roller 142 fixedly secured thereto for aiding movement of the tray 44" between its storage and loading positions.

Referring to FIGS. 12 and 13, a cover assembly, generally indicated at 144, extends along the back end 18" of the motor vehicle 14". The cover assembly 144 includes outer 146 and inner 148 panel members, as shown in FIG. 13. The outer 146 and inner 148 panel members are fixedly secured to the roof 12" and to the back end 18" of the motor vehicle 14". The outer panel member 146 defines a pocket 150 for receiving one of the pair of pivot arms 68", 70" therein when the tray 44" is in its storage position. The cover assembly 144 conceals one of the pair of pivot arms 68", 70" to improve the overall appearance of the motor vehicle 14".

It is appreciated that although the cover assembly 144 has been shown and described in relation to the third embodiment of the invention, the cover assembly 144 is equally applicable to all of the other embodiments disclosed herein.

Referring to FIGS. 14 through 16, wherein like triple primed reference numerals represent similar elements as those described above, in a fourth embodiment of the invention the drive mechanism is a belt 116''' extending between a pair of pulleys 152, 154. The pulleys 152, 154 are disposed along the channel 36'''. One of the pair of pulleys 152 is positioned at the fore end 30''' of one of the pair of rails 26''', 28'''. The other of the pair of pulleys 154 is positioned at the aft end 32''' of one of the pair of rails 26''', 28''', as is shown in FIG. 14. The pair of rails 26''', 28''' is shaped to accommodate the belt 116''' and the sliding bracket 56''' secured thereto.

Upon activation of the drive assembly 96", the belt 116" drives the sliding bracket 56''' between the fore 30''' and aft 32''' ends of one of the pair of rails 26''', 28''' to move the tray 44''' (not shown in FIGS. 14 through 16) between its storage and loading positions.

Referring to FIG. 17, wherein like quadruple primed reference numerals represent similar elements as those described above, in a fifth embodiment of the invention tray extension, generally indicated at 156, slidingly engages the tray 44''''. The tray extension 156, includes extension sides 158, 160 and an extension end 162 extending between the extension sides 158, 160.

The extension sides 158, 160 slidingly engage opposing sides 164, 166, each of which have a predetermined length, to move the tray extension 156 between a retracted position, indicated at A, and an extended position, indicated at B. When the extension 156 is in the retreacted position, the extension end 162 is disposed adjacent the second end 48'''' of the tray 44''''. When the extension 156 is in the extended position, the extension end 162 is spaced apart from the second 48'''' of the tray 44''''. As a result, the capacity of the roof rack assembly 10'''' is increased. As an added benefit, when the extension 156 is in the extended position, an individual storing an item on the tray 44'''' must only raise the item to the extension end 162, which is at a lower elevation than the second end 48'''' of the tray 44''''.

An extension latch (not shown) may be provided for selectively locking the extension 156 in the retracted position.

It is contemplated that the extension 156 of the current embodiment may be utilized with the roof rack assembly 10'''' in any of the embodiments set forth above.

The invention has been described in an illustrative manner. It is to be understood that the terminology, which has been used, is intended to be in the nature of words of description rather than of limitation. Many modifications and variations of the invention are possible in light of the above teachings. Therefore, within the scope of the appended claims, the invention may be practiced other than as specifically described.

What is claimed:

1. A roof rack assembly for storing items above a motor vehicle having a roof and a side fixedly secured to the roof, said roof rack assembly comprising:
   a pair of rails fixedly secured to the roof, said rails extending generally parallel to each other, each of said pair of rails having a fore end, an aft end, and a channel extending therein, at least one of said pair of rails defining an upper housing disposed above said channel and extending along a portion thereof;
   a tray having a first end, with opposite sides thereof slidingly engaging said rails and moveable between said fore and aft ends of said rails, said tray including at least one sliding bracket slidingly engaging said channel along at least one of said pair of rails;
   a pair of link arms pivotally extending between one of said pair of rails and said tray, said link arms including a slide bushing disposed within said upper housing and movable therealong as said sliding bracket moves along one of said rails;
   a pair of pivot arms, each of said pivot arms pivotally coupled to opposite sides of a second end of said tray linkably connecting and continuously supporting said tray to the vehicle; and
   when said first end of said tray is at the fore end of said rails, said tray is in a storage position and when said first end of said tray is at the aft end, said tray is in a loading position and maintained therein by said link arms, said tray extending over the vehicle when in said storage position and inclined relative to the vehicle when in said loading position.

2. A roof rack assembly as set forth in claim 1 further comprising mounting brackets fixedly securable to an aft end of the motor vehicle and pivotally coupled to the pivot arms, each of said mounting brackets having a stop for limiting pivotal movement of said pivot arms preventing said tray from moving beyond said loading position.

3. A roof rack assembly as set forth in claim 2 wherein said tray includes a pivot bracket extending downwardly from said second end thereof for pivotally coupling said tray to at least one of said pair of pivot arms.

4. A roof rack assembly as set forth in claim 3 wherein said sliding bracket includes a slide pin extending out therefrom for slidingly engaging said channel.

5. A roof rack assembly as set forth in claim 4 wherein said pivot bracket includes a pivot pin pivotally coupled to one of said pair of pivot arms at said receiving end thereof.

6. A roof rack assembly as set forth in claim 5 wherein said slide pin includes a roller fixedly secured thereto for enabling smooth sliding engagement of said tray along said rails.

7. A roof rack assembly as set forth in claim 6 wherein said tray includes a pair of storage ramps disposed therealong for retaining the items in place along said tray.

8. A roof rack assembly as set forth in claim 1 further comprising a drive mechanism operatively engaging said tray effecting said movement between said storage position and said loading position.

9. A roof rack assembly as set forth in claim 8 wherein said drive mechanism includes a lead screw disposed within said channel and a circular guide threadably engaging said lead screw for moving said tray along said rails.

10. A roof rack assembly as set forth in claim 9 including a motor drivingly engaging said lead screw.

11. A roof rack assembly as set forth in claim 10 including a pivot bracket extending downwardly from said second end of said tray.

12. A roof rack assembly as set forth in claim 9 including a motor operatively connected to said drive mechanism for moving said tray along said pair of rails.

13. A roof rack assembly as set forth in claim 8 wherein said drive mechanism includes a belt disposed within said channel.

14. A roof rack assembly as set forth in claim 13 wherein said drive mechanism includes a pair of pulleys disposed along said channel with said belt extending thereabout.

* * * * *